United States Patent [19]

Johnson

[11] Patent Number: 4,652,242

[45] Date of Patent: Mar. 24, 1987

[54] PSYCHOLOGICAL TESTING OF THE VISUALLY IMPAIRED

[76] Inventor: David G. Johnson, Lot 9 McMillan Rd., Newstead, Victoria 3462, Australia

[21] Appl. No.: 792,205

[22] Filed: Oct. 28, 1985

[30] Foreign Application Priority Data

Oct. 30, 1984 [AU] Australia ............................. PG7914

[51] Int. Cl.⁴ ............................................. G09B 21/00
[52] U.S. Cl. .................................... 434/363; 434/112; 434/236; 434/308
[58] Field of Search ............... 434/112, 113, 116, 236, 434/319, 320, 321, 322, 363, 364, 346, 308

[56] References Cited

U.S. PATENT DOCUMENTS 3,141,244  7/1964  Smith .............................. 434/363 X
3,283,416  11/1966  Taylor et al. ........................ 434/346

Primary Examiner—William H. Grieb
Attorney, Agent, or Firm—Dennison, Meserole, Pollack & Scheiner

[57] ABSTRACT

A system for psychologically testing visually impaired or reading impaired persons has a series of questions presented in a prerecorded audible form. An answer sheet having regions in which responses to each question may be recorded has associated with each of the regions a marker which may be removed, moved, or physically modified to record a desired response to each question. The regions for the recording of responses are associated with a tactilely locatable portion on each answer sheet which enables the regions to be easily located by touch, with each marker preferably being a tactilely locatable element which is similarly easily located by touch.

10 Claims, 3 Drawing Figures

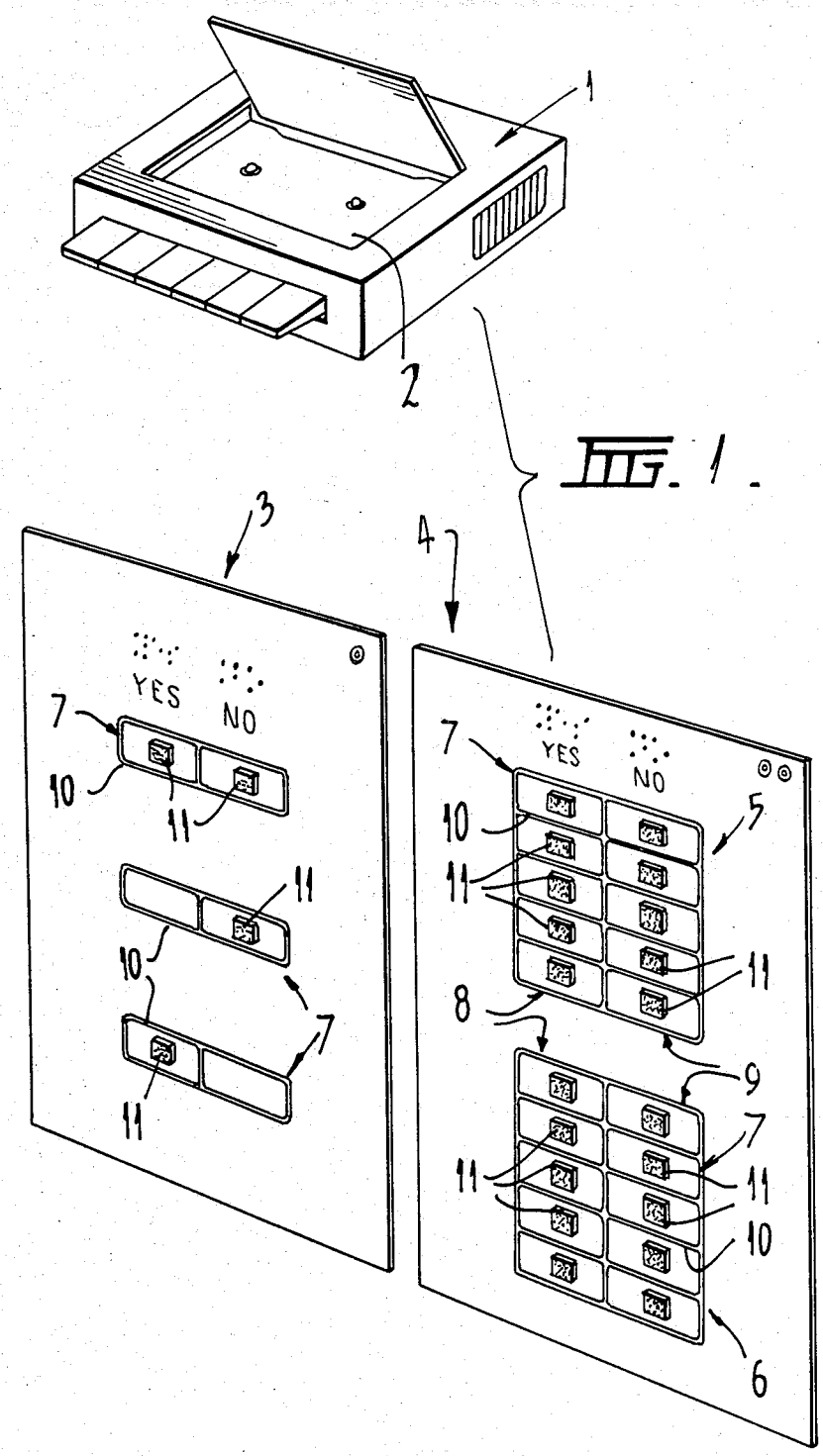

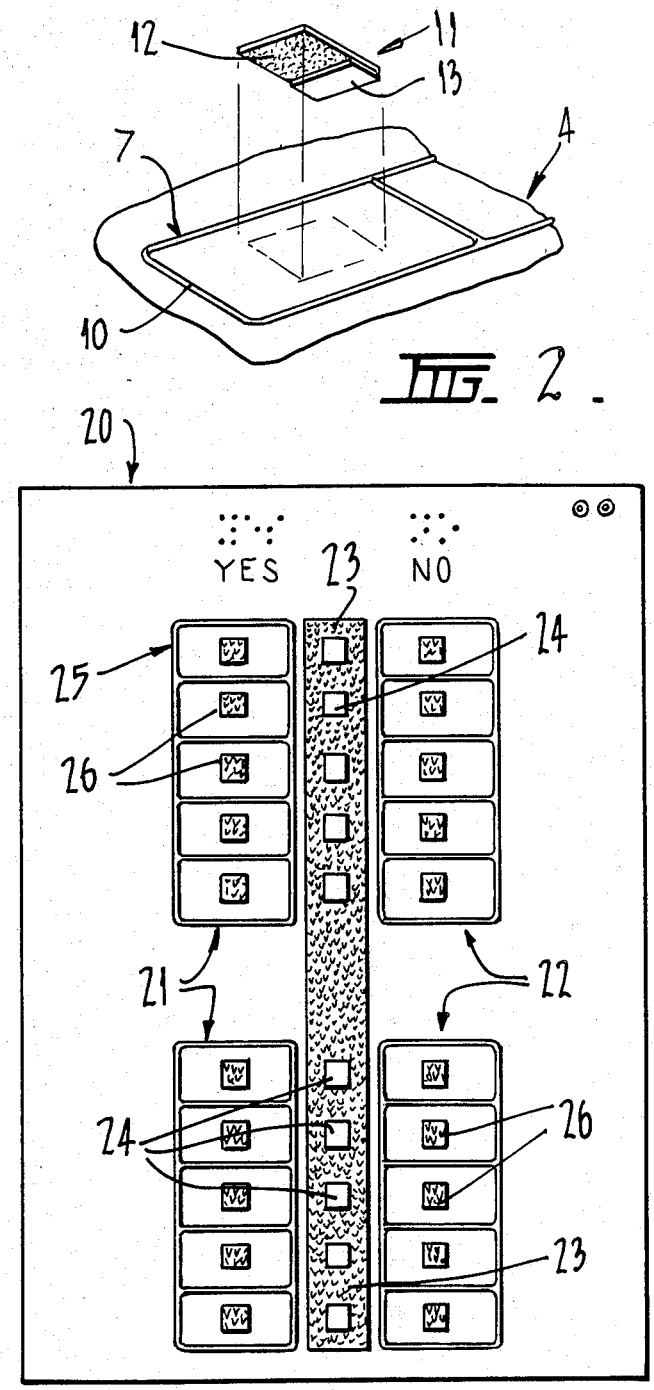

PSYCHOLOGICAL TESTING OF THE VISUALLY IMPAIRED

FIELD OF THE INVENTION

This invention relates to a system for the psychological testing of visually impaired or reading impaired persons.

BACKGROUND OF THE INVENTION

Objective testing of the visually impaired has long been, and remains, a significant problem to the researcher, psychologist and related professional. Predominantly, the problem stems from an enormous variation in the types and degree of visual handicap that exist among the visually impaired population, where, for example, a method designed to test the totally blind (e.g. braille) is inappropriate for the partially sighted (most of whom have never had to learn braille). It is this great heterogeneity among visually handicapped persons that has often required workers to employ deviations from standard test procedures in individual cases, (See "Measures of Psychological, Vocational & Educational Functioning in the Blind and Visually Handicapped. New York: American Foundation for the Blind, 1976—Scholl and Schnur).

Clearly, evaluation of the visually impaired has largely been the province of specialists. However, recent trends in America and Australia within the last decade have highlighted an increasing need. The mainstreaming of visually impaired children from special to regular education has resulted in pressure on teachers and school counsellors to assess the visually handicapped as well as sighted children. In addition, as Scholl and Schnur (1976) point out, members of the helping professions, psychologists, guidance personnel and rehabilitation workers are becoming increasingly required to evaluate children and adults with visual impairments. Consequently, it would seem that professionals can only meet this challenge if they have available of appropriate resources and methodologies for modifying and adapting their procedures.

Although a variety of methods have been employed to administer tests to the visually impaired, a number of problems can be identified in relation to the more commonly used approaches. Perhaps the most common method of administering written tests has required a one to one approach, where the administrator reads the questions to the testee, and records his responses. Whilst this method can be used with both totally and partially blind individuals, its relative simplicity should be weighed against its variation in administration between testees, the dependence on an intermediary, the lack of privacy for the testee, the passive role of the testee and the time and resources required for testing large samples. Alternatively, totally blind persons have been tested with a method requiring them to mark the braille letter of their answer with a pencil, directly on the question sheet. In such cases, the testee has no means of correcting or checking over his responses. Additionally, braille adaptations have been made to some of the more frequently used tests (e.g. Minnesota Multiphasic Personality Inventory), yet only a small number of people are proficient and comfortable in the use of braille, and at best, the whole procedure is very time consuming, cumbersome and costly.

Unfortunately, even tests developed specifically for the blind present a range of disadvantages—norms tend to be based on small numbers; norms are usually biased by use of institutionalized populations; norms do not appropriately represent totally and partially blind individuals; test instructions are usually amateurish and poorly standardized; and there is too little supporting literature for the test to make its interpretation accurate.

With these points in mind, it has been suggested that the ideal would probably be a test designed for oral administration. Indeed, the Verbal Scales of the Weschler Adult Intelligence Scales were designed for oral administration and are normed on that basis, and represent the most frequently used measures of abilities for blind persons. Importantly however, oral administration is clearly inappropriate for multiple choice questions, and seems best suited to the open ended or dichotomous (e.g. true/false, yes/no) response format.

BRIEF SUMMARY OF THE INVENTION

It is the object of the present invention to provide a system for the psychological testing of visually impaired persons in which the above shortcomings are overcome.

The invention therefore provides a system for psychologically testing visually impaired or reading impaired persons comprising a series of questions presented in a prerecorded audible form, an answer sheet having regions in which positive or negative responses to each question may be recorded, and a marker associated with each region and which may be removed, moved or physically modified to record a positive or negative response to each question.

The questions are preferably prerecorded on an audio tape cassette, although any other suitable recording medium may be used.

The regions for the recording of the responses are preferably surrounded by a raised portion which is either deposited or formed on the answer sheet in order that the regions may be easily located by touch. This may be achieved by the use of thermoform paper or stereocopier capsule paper or other such means that allows raised portions to be easily formed. Each marker preferably comprises an element formed in or attached to each answer sheet and which is easily located by touch. For example each marker may comprise an element of material having a portion thereof secured to the sheet. Testees indicate their response by removing the appropriate marker, either wholly or in part, from the sheet. It has been found that a small element of felt having a small portion attached to the sheet so that the non-attached portion of the element can be gripped for removal, is most satisfactory for this purpose. However, other materials with similar tactile qualities (e.g. card or vinyl), have also been found to be suitable. Similarly, other markers, such as depressable raised portions in the sheet which are permanently depressed by the testee by pressing the raised portion, may be used to equal advantage.

BRIEF DECRIPTION OF THE DRAWINGS

A preferred embodiment of the invention will now be described with reference to the accompanying drawings:

FIG. 1 is a schematic representation of a system embodying the invention;

FIG. 2 is an enlarged perspective view of one removable response marker; and

FIG. 3 is a schematic representation of an alternative response sheet.

The system shown in FIG. 1 of the drawings is the presently preferred embodiment of the invention, developed after empirical testing of a prototype form which utilized braille and large print media. The system includes an audio cassette player 1 by means of which a person to be tested listens to a prerecorded cassette tape 2 including an explanation of the test, with which a covering example page 3 is associated, and a series of questions requiring the persons response on a response sheet 4, only one of which is shown in FIG. 1. The number of response sheets will depend upon the length of the test(s) selected as most appropriate for the purposes of the assessment.

The covering example page 3 is introduced and explained in the prerecorded cassette tape 2 and includes an example of a "response box" 7 as well as examples illustrating "no" or "false" and "yes" or "true" responses.

Each response sheet 4 includes two blocks 5 and 6 of five response boxes 7 arranged in columns 8 and 9, in this example, a "yes" column 8 and a "no" column 9. Each response box 7 is defined by a raised border 10 which may be easily located by touch. In the present embodiment, the covering example page 3 and each response sheet 4 is formed from stereocopier capsule paper by means of which the raised borders 10 are formed. As shown in the drawings, the raised large print words "yes" and "no" are repeated in braille and each page is "numbered" by the quantity of raised black circles in the top right hand corner of each prize.

Each response box 7 contains a felt tab 11 which is secured by a region of contact adhesive 12 to the sheet 4. The adhesive 12 is covered at 13 to leave an unattached portion which may be gripped for removal of selected tabs 11.

The arrangement of the response boxes 7 in blocks of five eliminates the necessity to number each pair of boxes on the answer sheets 4 or to provide the "true" and "false" indicators used in the prototype form of the invention referred to above. The statements or questions recorded on the tape 2 are arranged in five question groups and accordingly, the numbering of each pair of response boxes needs only to range from 1 to 5 since most testees are believed to be capable of locating any particular question in a five question group.

The testee makes a response to each statement or question by listening to the statement or question and removing the felt tab 11 corresponding to the desired answer. The recording of the statements or questions allows approximately 10 to 15 seconds for the testee to decide upon and indicate a response. The tape 2 may of course be "paused" "replayed" or "speeded" if necessary.

The administration of this embodiment of the invention has been critically examined in relation to 54 subjects under both sighted and blindfolded conditions. In each case, the testing procedure was shown to be self administerable as all subjects were able to correctly complete the test without the use of an intermediary.

More importantly, a three-way comparison of each testee's scores obtained from (i) administration of the above described procedure under sighted conditions; (ii) administration of the above described procedure under blindfolded conditions; and (iii) administration of the standard pencil and paper technique, revealed a clear lack of score differences or methodological effects, (refer (i), (ii), (iii) and (iv) below).

The prototype system referred to above was different to the above described embodiment in the following material respects:

The covering example page included an example statement in braille and large print as well as a description of an answer box and examples illustrating "true" and "false" responses in braille and large print.

The response sheets comprise a continuous series of response boxes which were numbered in large print and in braille and also included the indications "T" for true and "F" for false in both large print and braille for each response box.

The prototype system was tested in an experiment involving nearly all the known (145) legally blind children in the State of Victoria. Many of the cassettes and answer sheets were sent by mail (the others being hand delivered) and in all cases, no intermediary was used. Of the 145 answer sheets returned by the testees, all but one were properly completed, demonstrating the viability and effectiveness of the testing system in that no problems were experienced in understanding and completing the test. In the case of the improperly completed response, approximately two thirds of the questions were answered and the remaining questions were apparently ignored.

It is important to note that the simplified testing system represented by FIG. 1 not only maintains all the advantages and advancements offered by the prototype procedure, but also allows those visually impaired persons who are not trained in the use of braille, to be tested. As a consequence, the system of psychological testing presented in FIG. 1 will accommodate virtually all persons with total or partial visual impairment as well as those who suffer any form of reading disability.

It will be appreciated from the above that the system of psychological testing according to the invention has the following significant advantages:

(i) the administration and response methodology has been standardized for both partially and totally blind individuals.

(ii) the procedure allows for the valid comparison of results between sighted (using pencil and paper techniques) and blind testees.

(iii) the procedure allows for the valid comparison of results between partially and totally blind individuals.

(iv) the procedure may also be validly used in relation to testees with limited literacy skills and those who may suffer any phsyical or psychological handicapped that may prevent them from undertaking a standard paper and pencil test.

(v) due to the above, the procedure allows for the systematic development of valid comparative norms for the visually impaired and other groups of handicapped people on a wide range of well established personality, interest, vocational guidance and various other forms of psychological inventories.

(vi) due to the above, the procedure provides for an objective examination and analysis of test data relative to the visually impaired and other groups of handicapped people by offering:

(a) a new and valid investigative tool to the researcher that opens up a vast new world of previously unobtainable information.

(b) a new and valid assessment tool to the clinician that significantly broadens the scope of objective diagnostic methodologies.

(c) a new and valid method of providing guidance and self awareness in the area of specialist counselling, such as vocational guidance.

(d) a new and valid method for a more objective and scientific orientation to vocational selection, placement and classification, for the personnel professional and vocational counsellor.

(vii) the procedure has a very broad realm of application in generalizing to many other forms of information exchange, especially, but not exclusively where standardized procedures are required. Some examples could include application forms, order forms, information circulars, admittance forms, surveys, questionnaires, request forms, psychological tests, etc.

(viii) the procedure can easily be extended to trichotomous response formats by directing that a third alternative be indicated by either leaving or removing both markers.

(ix) the procedure provides facility for the group testing of the visually impaired and other groups of handicapped people.

(x) the procedure is very simple and requires no equipment on behalf of the testee.

(xi) the procedure allows for subjects to change responses and check over their own answer sheets.

(xii) the response sheets may be reusable and thus relatively cost effective.

In the alternative response sheet 20 shown in FIG. 3 of the drawings, the "yes" and "no" columns 21 and 22 are separated by a strip 23 of Velcro (Registered Trade Mark) on which felt tabs 24 having Velcro attached to one face are supported. Each response box 25 contains a Velcro element 26 attached to the sheet 20 and a response is recorded by removing a tab 24 from the strip 23 and attaching it in the selected response box 25. This embodiment has the advantage of being more readily reusable than the previous embodiment in that the tabs only have to be replaced on the centre strap 23 in order that the response sheet(s) 20 may be reused (rather than wasted as in the previous embodiments).

It will be appreciated that the questions asked via the audio tape cassette may be varied to suit the subject of the test and the number of response boxes included on the response sheets are of course varied to suit the number of questions asked. Although the instructions and questions included on the audio tape cassette are not central to the present invention, a typical script, designed purely for research pruposes, recorded on the tape 2, including five sample questions is set out below.

TAPE SCRIPT

Hello, my name is David Johnson.

The purpose of this tape is to seek your help with a major research project. The aim of the project is to develop new ways for *all* visually impaired people to express some of their ideas.

The questions on this tape will only take about 30 minutes to complete, and your answers will be *COMBINED* with those of all the other people involved. This means that the results will be based ENTIRELY on *GROUP* information—so EVERYONE'S answers are vitally important, and the questions need to be answered carefully and thoughtfully.

There are no RIGHT or WRONG answers to ANY of the questions, but only 'YES' or 'NO' answers that you think best apply to you. So—this is *NOT* a test to see who has the highest or lowest score—it is simply a way of organizing and communicating some of your ideas.

Make sure that you have your Answer Booklet handy. Position the booklet so that the binding is on the left hand side, and a raised black circle can be felt in the top right hand corner of the front page. (pause 10 secs).

There are 90 short questions on this tape. These have been designed to tap some of your ideas on the way you behave, feel and act, and you will probably find them quite interesting.

Listen to each question and try to decide whether 'YES' or 'NO' represents your *usual* way of acting or feeling. To answer 'YES', you simple peel off the piece of felt tape in the 'YES' or left hand column. To answer 'NO', you peel off the piece of felt tape in the right hand or 'NO' column.

Now, just to make things a bit clearer, let's take a look at the example on the front page of your Answer Booklet. (pause 5 secs). Notice that the 'YES' and 'NO' columns are clearly shown in braille and large print at the very top of the page . . . (pause 5 secs). Immediately underneath, you will find an example of an answer box . . . (pause 5 secs). There is a piece of felt tape in both the left and right sides of the box . . . (pause 5 secs).

Now let's imagine the question is . . . "Do you usually feel bright and cheerful in the mornings?" There are two ways that you can answer this statement, either 'YES' or 'NO'.

So take a look at the answer box in the middle of the page. If you mostly agree that you feel bright and cheerful in the mornings, then you would *peel off* the piece of felt tape from the 'YES' side of the box, which is on the left hand. This has been done in the example.

Now go to the answer box at the bottom of the page. If you mostly DISAGREE that you feel bright and cheerful in the mornings, then you would *peel off* the piece of felt tape from the 'NO' side of the box, which is on the right hand side.

When you are actually doing the questionnaire, make sure that you remove only *one* answer for each question.

Should you wish to change an answer—stop the tape—*replace* the incorrect answer—then remove your desired answer.

IT IS MOST IMPORTANT THAT YOU ANSWER *EVERY* QUESTION, AND THAT YOU REMOVE ONLY *ONE* ANSWER FOR EACH QUESTION.

You may wish to *pause* the tape or *replay* a question before answering. However, this probably won't be necessary.

Now, just before we begin, turn over to the next page of your Answer Booklet. This page has *two* raised black circles in the top right hand corner—(pause 10 secs).

Notice that the answer page is divided into upper and a lower section, each containing a block of *five* answer boxes (pause 10 secs). So—you begin by answering from the answer box at the very top of the page, and work your way down through each set of five questions.

Notice also that the 'YES' and 'NO' columns have been clearly labelled in braille and large print on the top of the page. The following eight pages of this Answer Booklet are identical to this.

You will be reminded on the tape when to begin a new block of five answers and when to turn the page. Also, each page will be identified by the number of raised black circles in the top right hand corner. Importantly, these checks will help to ensure that you are answering the correct question in the correct answer box. Some people may prefer to run their free hand down the page from one answer to the next, as they answer.

The tape should only take about 20–25 minutes to finish from here.

Remember, answer *EVERY* question and don't spend too much time thinking over you answers. There are no trick questions—so work quickly—your first reaction is the important thing.

The *TOP* half of each piece of felt tape has been deliberately left NON-ADHESIVE—so you will find it easiest to peel off each felt piece by grasping the *top flap* and *peeling down*.

We are now ready to start, so move to the answer box at the very top of the page . . . (pause 5 secs).

QUESTION NO. 1

Do you have many different hobbies?
(pause 10 secs)
(Just a reminder, to answer 'YES' peel off the tape from the *left* or *YES* side of the box—to answer 'NO', peel off the tape from the *NO* or right hand side of the box).

QUESTION NO. 2

Do you stop to think things over before doing anything?
(pause 10 secs)

QUESTION NO. 3

Does your mood often go up and down?
(pause 10 secs)

QUESTION NO. 4

Have you ever taken the praise, for something you knew someone else had really done?
(pause 10 secs)

QUESTION NO. 5

Are you a talkative person?
(pause 10 secs)
You have now finished the top set of five questions. Now move to the bottom set of answer boxes.

Further questions were then asked.

The claims form part of the disclosure of this specification.

I claim:

1. A system for psychologically testing visually impaired or reading impaired persons comprising a series of questions presented in a prerecorded audible form, an answer sheet having regions in which positive or negative responses to each question may be recorded and a marker associated with each region and which may be removed, moved or physically modified to record a positive or negative response to each question, said regions for the recording of responses being surrounded by a raised portion on each answer sheet to enable the regions to be easily located by touch, each marker comprising an element which is similarly easily located by touch.

2. The system of claim 1, wherein each marker comprises an element of material having a portion thereof removably secured to the sheet whereby the appropriate marker is removed to indicate the appropriate response.

3. The system of claim 2, wherein each marker comprises a small element of fabric adhesively attached to the sheet.

4. The system of claim 2, wherein each response region includes an element of attachment medium by means of which a marker may be attached to the response region to record a positive or negative response to each question.

5. The system of claim 4, further including a strip of attachment medium located adjacent to said response regions for supporting a multiplicity of markers ready for use to record a positive or negative response to each question.

6. A system for psychologically testing visually impaired or reading impaired persons comprising a series of questions presented in a prerecorded audible form, an answer sheet having regions in which responses to each question may be recorded and a marker associated with each of the regions and which may be removed, moved or physically modified to record a desired response to each question, said regions for the recording of responses being associated wtih a tactilely locatable portion on each answer sheet which enables the regions to be easily located by touch, each marker comprising a tactilely locatable element which is similarly easily located by touch.

7. The system of claim 6, wherein each tactilely locatable portion comprises a raised portion on each answer sheet.

8. The system of claim 6, wherein each marker comprises a small element of material adhesively secured to the sheet.

9. The system of claim 6, wherein the questions are recorded on an audio tape cassette which further includes an introduction and explanation of the test and the answer sheet is associated with a covering example page including an example positive and negative response region as well as examples illustrating both positive and negative responses.

10. A method for psychologically testing visually impaired or reading impaired persons comprising the steps of recording a series of questions in an audible form, preparing an answer sheet having regions for the recording of responses to each question, providing a marker removeably associated with a respective one of each region permitting recordation of a desired response to each question, the step of preparing an answer sheet having regions for the recording of responses including a step of preparing a tactilely locatable portion on each answer sheet which enables the regions to be easily located by touch, and the step of providing a marker including the step of providing a tactilely locatable element on each answer sheet which is similarly easily located by touch, and presenting the recorded questions and answer sheets to the persons to be tested and collecting and analysing the answer sheets following conclusion of each test.

* * * * *